United States Patent [19]

Bondy

[11] Patent Number: 4,569,460
[45] Date of Patent: Feb. 11, 1986

[54] STORAGE CONTAINER

[76] Inventor: Ferdinand H. Bondy, 1916 S. Washington St., Tacoma, Wash. 98405

[21] Appl. No.: 671,104

[22] Filed: Nov. 13, 1984

[51] Int. Cl.[4] .................................. B65D 21/00
[52] U.S. Cl. .................... 220/375; 220/240; 220/378; 220/344
[58] Field of Search .............. 220/375, 1.5, 430, 240, 220/308, 310, 344, 351, 356, 357, 358, 378, 61 R, 359, 364

[56] References Cited

U.S. PATENT DOCUMENTS

| 1,904,250 | 4/1933 | Purvis | 220/240 |
| 2,435,006 | 1/1948 | Jeffery | 220/344 X |
| 2,709,092 | 5/1955 | Wallace | 220/378 X |
| 3,192,690 | 7/1965 | Taylor | 220/378 |

Primary Examiner—Steven M. Pollard
Attorney, Agent, or Firm—David L. Garrison; Ford E. Smith

[57] ABSTRACT

The present invention is a high integrity storage container which is particularly well adapted for storage of chemical, radio-nucleide, or other types of waste materials. The body portion will typically be of right rectangular configuration having an open top. An inwardly oriented flange is located completely around the upper periphery of the container body where it acts with a corresponding mating surface on a lid to provide sealing surfaces. A key element is a novel folded gasket located between the mating surfaces of the body and lid. This is oriented with the fold portion toward the outer periphery of the container where it has minimum exposure to the contents. Preferably, the lips or edges of the gasket are bonded to the lid and body flange by a pressure sensitive adhesive to form a tight seal. A resilient strip is located within the folded area of the gasket to urge the adhesive coated surfaces into intimate contact with the mating surfaces of the lid and body flange. The use of the inwardly located flange allows close contact between adjacent containers in a storage area so that waste space is minimized. The folded gasket acts like a bellows to maintain the seal integrity if stresses during use cause minor displacement between the container body and lid.

17 Claims, 3 Drawing Figures

U.S. Patent   Feb. 11, 1986   4,569,460
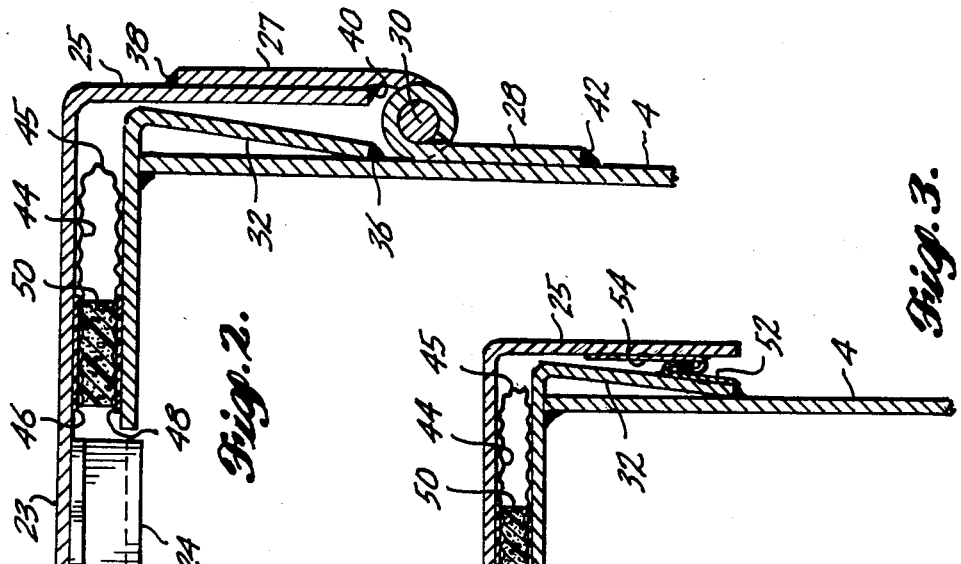
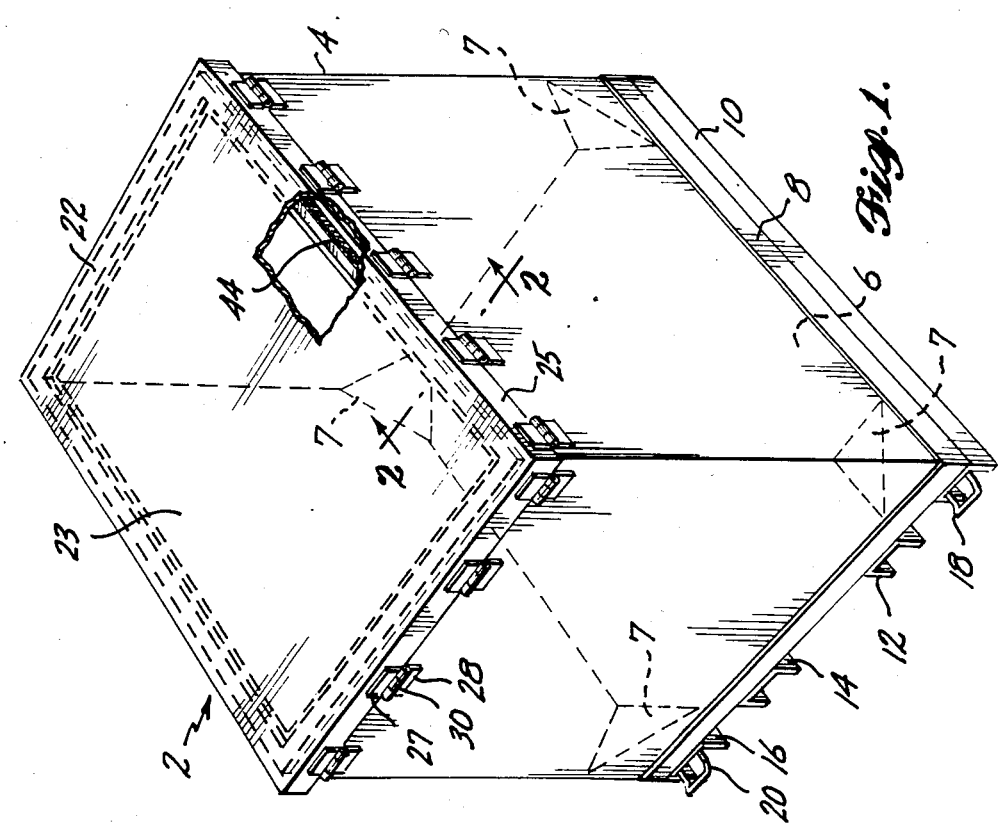

STORAGE CONTAINER

BACKGROUND OF THE INVENTION

The present invention relates to an improved storage container. This container is particularly useful for the long-term storage of waste materials which may or may not include moderate levels of radionuclides.

The safe long term storage of chemical and nuclear materials which are environmentally hazardous has become a major problem for the developed nations of the world. There are a relatively minor number of disposal sites which can accommodate these materials. In many cases the waste material must be shipped and stored or buried in an approved container having an assured minimum lifetime. A broad range of government regulations exist which define the requirements that must be met by waste material storage containers for use in various types of service.

One problem frequently encountered with waste storage containers, particularly those made in larger sizes, is in assuring a tight leak-proof fit of a lid or cover which is applied after the container is filled. My earlier patent, U.S. Pat. No. 4,381,844, describes a suitable sealing means for such a container. It shows a relatively large metallic container having a right rectangular configuration. The upper periphery is surrounded by an outwardly extending flange which mates with a similar planar portion on the lid. The lid is secured with four hinge-like fasteners. The hinge pins can be inserted after the container is filled to securely fasten the lid. The gasket used between the lid and the container flange consists of a piece of flexible fabric-like material longitudinally folded upon itself. The folded portion is allowed to extend for a short distance within the container, while the two lips of the gasket are adhesively bonded to the container flange and lid. Other remotely similar gasket types are shown in U.S. Pat. No. 3,230,290 to Nelson and U.S. Pat. No. 3,269,585 to Christensen. U.S. Pat. No. 3,406,863 to Wenzel et al. shows a somewhat different approach to gasketing a high pressure vessel. U.S. Pat. No. 3,481,503 to Kloess et al. shows a more conventionally gasketed freight container.

While all of the above mentioned devices have apparently been useful for the purposes intended, none has been fully satisfactory for the long-term storage of waste materials. As one example of a problem, the outwardly extending flange on the construction, shown in my earlier patent, prevents tight side-to-side storage configurations with the result that a significant amount of valuable space is wasted. Further, the critical fold portion of the gasket is exposed to the contents which may induce premature deterioration. As will be seen, the present invention overcomes these and other problems in the construction of durable high integrity storage containers.

SUMMARY OF THE INVENTION

The present invention comprises a high integrity storage container. In general this will be of right rectangular configuration, although it will be readily apparent that the invention is not limited to containers of this particular shape. The body of the container will have an open top with an inwardly oriented flange completely around and substantially contained within the upper periphery. When so installed, the flange presents an essentially planar sealing surface for a lid and does not interfere with tight wall-to-wall container storage. A lid is provided which has a corresponding co-extensive, essentially planar mating surface for the container body flange. Attachment means of various types can be provided for securing the lid to the container.

A key element of the invention is a novel longitudinally folded flexible gasket means. This is located between the mating surfaces of the container and lid with the fold portion oriented toward the outer periphery of the container. With this orientation it is essentially out of contact with and protected from the contents of the container. Preferably the edge or lip portions of the gasket; i.e., those portions opposite the fold, are adhesive coated to bond the gasket to the container and lid mating surfaces. In the preferred construction the gasket further contains a longitudinal compressible resilient strip within the folded area. This serves to urge the adhesive coated surfaces into intimate contact with the appropriate areas of the lid and container flange.

One preferred method of securing the lid to the container is by use of a hinge which is substantially the full length of one edge of the container. The other edges of the lid can ultimately be secured by hinge-like fasteners in which one portion of the hinge is attached to the lid and a corresponding portion to the container. When the lid is in place, the hinge pins of these fasteners can be inserted to secure the lid. If desired, these pins can be later removed to permit opening the container. These hinge-like fasteners can be the full length of the other three edges of the container. Alternatively, a plurality of the hinge-like fasteners can be used, each of which will be substantially shorter than the edge to which it is attached.

A further alternative lid securing means is the use of opposed elongated interlocking flexible hooks. In this construction one of the securing members, which can be made of relatively lightweight sheet metal, is attached to the body of the container with the upper edge of the member bent over so that it forms an outwardly and downwardly oriented hook. A corresponding upwardly oriented hook is fixed to a downwardly depending flange around the periphery of the lid. When the lid is closed, the hooks will deflect and slide over each other as the lid is closed until they ultimately snap back and firmly lock the lid in place.

As used in the present context, the term "high integrity", does not refer to any particular set of specifications but is merely used to indicate the secure nature of the sealed container and its resistance to leakage of its contents under adverse storage conditions.

It is an object of the present invention to provide a high integrity storage container which can be simply constructed yet is suitable for long term storage of many materials.

It is a further object to provide a storage container with an improved gasketing arrangement wherein the gasket is not subject to deterioration from the contents of the container.

It is a further object to provide an improved storage container of right rectangular construction which can be tightly stored against a similar adjacent container without the waste of intervening space.

These and many other objects will become readily apparent on reading the following detailed description taken in conjunction with the drawings.

BRIEF DESCRIPTION OF THE DRAWINGS

FIG. 1 is an isometric view of one version of the present storage container with a portion cut way to show details of the seal.

FIG. 2 is a partial cross sectional view taken along section 2—2 through an upper edge of the container showing one lid attachment system.

FIG. 3 shows an alternative lid attachment system.

DETAILED DESCRIPTION OF THE PREFERRED EMBODIMENTS

Referring now to FIG. 1, the complete container is generally shown at 2. It comprises a container body portion 4 which serves to hold the ingredients being stored. Body portion 4 will normally be made of a metal or alloy having suitable corrosion resistance against the contents and the environmental shortage conditions. The container body has a bottom 6 made of similar metal to the walls. Corners may be reinforced with gussets 7, shown only in the lower corners of the container in order to simplify the drawing. Similar reinforcing gussets may be placed at all eight corners of the container, if desired. The bottom edge of the container body may have a reinforcing strip 8 around the perimeter. This can be angle iron forming a continuous cradle around the bottom perimeter of the container body. The container shown rests on inverted channel iron lengths 10, 12, 14, and 16. These serve both as reinforcing and bearing members and to elevate the container bottom sufficiently above a floor surface to permit handling by a lift truck. The corners of the container may be optionally fitted with lifting tabs 18, 20 to permit handling by a hoist and sling arrangement. An inwardly oriented flange 22 is located around the perimeter at the top of the container body. The upward facing surface portions of this flange lie on a common plane where they present a sealing surface for an equivalent planar surface on a lid. A lid 23 has optional transverse reinforcing members 24 and a downwardly depending flange portion 25 entirely around its outer periphery. Sufficient clearance is provided so that the container body will telescope within the downwardly depending flange around the lid.

The lid may be attached to the container for ultimate storage by a number of alternative means. One method can be the use of continuous hinge-type fasteners as shown in my earlier patent, U.S. Pat. No. 4,381,844. Alternatively, one edge may have a continuous hinge and the other edges may have a plurality of interrupted hinges, each of which is substantially shorter than the edge to which it is attached. These interrupted hinges are generally shown at 26 and have one portion 27 attached to the lid and an interfingering portion 28 permanently attached to the container body. A removable pin 30 will serve to unite the fasteners when the container is filled and ready for storage.

The details of the hinge-type securing means and the sealing means are better seen by reference to FIG. 2. Here the body flange 22 is shown as an angled member having a downwardly oriented portion 32 which may lie along either surface of the container body walls. As shown here it is adjacent to the outside surface. Flange member 22, 32 is permanently attached to the body by weldments 34, 36. The top portion of the interrupted hinge-type fastening means is secured to lid flange 25 by weldments 38, 40, while the bottom portion is secured to the body by weldment 42.

An important aspect of the present invention is the gasketing method designed to insure a durable, flexible, and permanent seal between the lid and the container body. This gasket 44 is formed of a flexible material which is folded back upon itself with the fold portion 45 oriented toward the outer periphery of the container. The edge or lip areas 46, 48 of the gasket are preferably adhesively bonded to the body flange area and to the corresponding areas of the lid. A resilient strip 50 is designed with sufficient thickness so that it will be under moderate compression when the container is closed. This serves to urge the adhesive coated gasket surfaces into intimate contact with the mating flange and lid surfaces. This gasketing arrangement constitutes a major improvement over earlier containers of this type since only the edge or lip areas 46, 48 of the gasket are exposed to the contents of the container. The folded construction acts as a bellows to accomodate considerable misalignment between the lid and body as may occur from stresses induced during use, without loss of integrity of the seal.

The gasket adhesive may conveniently be a pressure sensitive type, while the gasket itself may be of any flexible material of suitable composition to generally withstand exposure to the materials being stored. Examples of suitable material would be neoprene, a neoprene or vinyl coated fabric, or sheet lead. The lead sheet material preferably should be bonded to a higher strength material such as fiberglass or other high strength corrosion resisting long lasting material. The latter may be used where especially long-term storage is anticipated. A soft rubbery elastomer, foamed rubber, or a urethane foam of suitable compressive resistance are exemplary of materials suitable for the resilient strip.

An alternative and generally more permanent means of securing the lid is shown in FIG. 3. An elongated hook-type strip 52 is attached to the upper body portion 32 so that the hooked portion is downwardly and outwardly oriented. A corresponding inwardly and upwardly hooked strip 54 is attached to the flanged portion 25 of lid 23. The hooked strips are made sufficiently flexible so that they will deflect and slide over each other as the lid is closed. Ultimately, they will snap into place and firmly lock the lid.

It will be readily apparent to those skilled in the art that many alternative forms of construction can be used without departing from the spirit of the present invention. The invention is to be considered as limited only by the following claims.

What is claimed is:

1. A high integrity storage container which comprises:
   a. an open-topped container body means having an inwardly oriented flange means around and substantially contained within the upper periphery thereof
   b. a lid means having a coextensive mating surface for the container flange means;
   c. means for securing the lid to the container; and
   d. a longitudinally folded flexible gasket means located between the mating surfaces of the container and lid means with the fold portion oriented toward the outer perphery of the container to as to be essentially out of contact with the contents of the container, the edge portions of the gasket means opposite the fold are adhesive coated to bond the gasket means to the mating surfaces of the container and lid means, the gasket means further having a compressible resilient means contained within the folded area for urging the adhesive coated surfaces into intimate contact with the mating surfaces, whereby if misalignment or distortion occurs between the container and lid means during use the gasket means can adjust to maintain the integrity of the seal.

2. The container of claim 1 in which the compressible resilient means is a polymeric foam.

3. The container of claim 1 in which the adhesive is a pressure sensitive material.

4. The container of claim 1 in which the gasket means is lead.

5. The container of claim 1 in which the container means is of right rectangular configuration.

6. The container of claim 5 in which one edge of the lid means is attached to the container means by a hinge which is substantially the full length of the corresponding edge of the container.

7. The container of claim 6 in which the other edges are secured by hinge-like fasteners, the hinge pins of the fasteners being removable to permit opening the lid.

8. The container of claim 7 in which the other edges are secured by a plurality of hinge-like fasteners, each of which is substantially shorter than the length of the edge to which it is attached, the hinge pins of the fasteners being removable to permit opening the lid.

9. The container of claim 6 in which the other edges are secured by opposed, elongated interlocking flexible hook means.

10. The container of claim 6 in which the other edges are secured by a plurality of opposed elongated interlocking flexible hook means each of which is substantially shorter than the edge to which it is attached.

11. The container of claim 1 in which the corner zones are reinforced by internal gussets.

12. A high integrity storage container resistant to leakage which comprises:

a. an open top container body means of right rectangular configuration, said means having an inwardly oriented flange around and substantially contained within the upper periphery thereof;

b. a lid means having a coextensive mating surface for the container flange, said lid means being attached to the container means by a hinge which is substantially the full length of one edge of the container;

c. a plurality of securing means for locking the lid means to the container means, the securing means being in the form of hinge-like fasteners with removable hinge pins to permit opening the lid; and d. a longitudinally folded flexible gasket means located between the mating surfaces of the container and lid means with the fold portion oriented toward the outer periphery of the container so as to be essentially out of contact with the contents of the container, the edge portions of the gasket means opposite the fold being adhesive coated to bond the gasket means to the mating surfaces, whereby if misalignment or distortion occurs between the container and lid means during use, the gasket means can adjust to maintain the integrity of the seal.

13. The container of claim 12 in which the gasket means further comprises a strip of resilient polymeric foam within the folded area for urging the adhesive coated surfaces into contact with the mating surfaces of the container and lid means.

14. The container of claim 12 in which the gasket is lead.

15. The container of claim 12 in which the securing means comprise a plurality of hinge-like fasteners with removable hinge pins to permit opening the lids.

16. The container of claim 12 in which the securing means comprise a plurality of opposed elongated, interlocking flexible hook means.

17. The container of claim 12 in which the corner zones are reinforced by internal gussets.

* * * * *